US008116521B2

(12) United States Patent
Hamada

(10) Patent No.: US 8,116,521 B2
(45) Date of Patent: Feb. 14, 2012

(54) MOVING BODY IMAGE EXTRACTION APPARATUS AND COMPUTER READABLE STORAGE MEDIUM STORING PROGRAM

(75) Inventor: Akira Hamada, Sagamihara (JP)

(73) Assignee: Casio Computer Co., Ltd., Tokyo (JP)

( * ) Notice: Subject to any disclaimer, the term of this patent is extended or adjusted under 35 U.S.C. 154(b) by 846 days.

(21) Appl. No.: 12/195,499

(22) Filed: Aug. 21, 2008

(65) Prior Publication Data
US 2009/0060275 A1 Mar. 5, 2009

(51) Int. Cl.
*G06K 9/00* (2006.01)
(52) U.S. Cl. ....................................................... 382/103
(58) Field of Classification Search .................. 382/103, 382/104, 266, 269; 348/135, 169; 700/191, 700/194, 195
See application file for complete search history.

(56) References Cited

U.S. PATENT DOCUMENTS

| 6,665,342 B1 | 12/2003 | Brown et al. | |
| 6,754,369 B1* | 6/2004 | Sazawa | 382/105 |
| 6,977,664 B1* | 12/2005 | Jinzenji et al. | 345/629 |
| 2001/0012379 A1* | 8/2001 | Amemiya et al. | 382/103 |
| 2003/0215141 A1* | 11/2003 | Zakrzewski et al. | 382/190 |
| 2007/0013718 A1* | 1/2007 | Ohba | 345/629 |
| 2007/0058837 A1* | 3/2007 | Boregowda et al. | 382/103 |

FOREIGN PATENT DOCUMENTS

| JP | 09-102910 A | 4/1997 |
| JP | 10-290450 A | 10/1998 |
| JP | 2004-199378 A | 7/2004 |
| JP | 3793258 B2 | 4/2006 |

OTHER PUBLICATIONS

European Search Report dated Mar. 11, 2010 issued in counterpart European Application No. 08015122.8-2218/2031562.
Assa et al., "Action Synopsis: Pose Selection and Illustration," ACM Transactions on Graphics, vol. 24, No. 3, Jul. 2005, pp. 667-676, XP002554048, ISSN: 0730-0301.
Rav-Acha et al., "Making a Long Video Short: Dynamic Video Synopsis," Computer Vision and Pattern Recognition, 2006 IEEE Computer Society Conf. on New York, NY, USA Jun. 17-26, 2006, Piscataway, NJ vol. 1, pp. 435-441, XP 010922851, ISBN: 978-0-7695-2597-6.
Blinn, J. F., "Compositing, Part I: Theory" IEEE Computer Graphics and Applications, IEEE Service Center, New York, NY, US, vol. 14, No. 5, Sep. 1, 1994, pp. 83-87, XP002212541, ISSN: 0272-1716.
Gevers, T. "Robust Segmentation and Tracking of Colored Objects in Video" IEEE Transactions on Circuits and Systems for Video Technology, IEEE Service Center, Piscataway, NJ, US, vol. 14, No. 6, Jun. 1, 2004, pp. 776-781, XP001196866, ISSN: 1051-8215.
Japanese Office Action dated Jul. 14, 2008 and English translation thereof issued in a counterpart Japanese Application No. 2007-224168.

* cited by examiner

*Primary Examiner* — Jason M Repko
*Assistant Examiner* — Shervin Nakhjavan
(74) *Attorney, Agent, or Firm* — Holtz, Holtz, Goodman & Chick, PC

(57) ABSTRACT

A moving body image extraction apparatus calculates difference intensity relating to a background portion with respect to a plurality of frame of continuous shoot, calculates a value by dividing difference intensity of an arbitrary frame of the plurality of frames by summed difference intensity for the plurality of frames, outputs an extracted image of a moving body in the arbitrary frame based on the calculated value.

12 Claims, 11 Drawing Sheets

MOVING BODY IMAGE EXTRACTION APPARATUS AND COMPUTER READABLE STORAGE MEDIUM STORING PROGRAM

CROSS-REFERENCE TO RELATED APPLICATIONS

This application is based on and claims the benefit of priority from the prior Japanese Patent Application No. 2007-224168, filed on Aug. 30, 2007, and including specification, claims, drawings and summary, the entire contents of which are incorporated herein by reference.

BACKGROUND OF THE INVENTION

1. Field of the Invention

The present invention relates to a moving body image extraction apparatus for extracting an image of a moving body from continuous frames and a computer readable storage medium storing a program.

2. Description of the Related Art

In recent years, the technology which arranges in order continuous shots of a moving body and combines the shots as one image begins to be used in the broadcast industry, and so on.

Also, for example, the technology which separates a frame to a background having complex moving objects such as spectators or trees etc and a moving body in a video including the background from a plurality of frames, and extracts the moving body sequentially to combine it is well known.

By this technology, it is possible to statically grasp the whole motion of a certain period, and it is convenient for the kinematic analysis of the moving body such as sport research, and so on. That interests as the video special effect.

However, when only the maximum component of labeling is selected after binarizing an image to extract the moving body, the quality deterioration that a portion image (if the moving body is human, the portion image is an image of the head or the hand and foot) of the moving body is lacked entirely may occur because of discontinuity of connectivity. Also, when a plurality of moving bodies is contained in a frame, it is impossible to extract all the plurality of the moving bodies. Furthermore, though the extracted image is generated by the reduced frame, the intense jaggy defect may occur in the outline of the extracted image when the generated image is applied to an image of the actual size.

Also, it is difficult to obtain a composite image having no unpleasant sensation because a boundary itself between the background portion and the moving body portion becomes ambiguous by illumination variations, motion blur, shadow/reflection of the moving body, noise, and so on.

SUMMARY OF THE INVENTION

It is an object of the present invention to provide a moving body image extraction apparatus capable of extracting a proper image of a moving body and outputting it stably, and a computer readable storage medium storing a program.

In order to achieve the object, according to a first aspect of the present invention, there is provided a moving body image extraction apparatus which comprises a first calculation section for calculating difference intensity relating to a background portion or other frame with respect to a plurality of frames, a summing section for summing the difference intensities of the plurality of frames calculated by the first calculation section, a second calculation section for calculating a value by dividing the difference intensity of an arbitrary frame of the plurality of frames by the difference intensity for the plurality of frames summed by the summing section, and a first output section for outputting an extracted image of a moving body in the arbitrary frame based on the value calculated by the second calculation section.

Also, according to a second aspect of the present invention, there is provided a computer readable storage medium storing a program that causes a computer to realize a first calculation function of calculating difference intensity relating to a background portion or other frame with respect to a plurality of frames, a summing function of summing the difference intensities of the plurality of frames calculated by the first calculation function, a second calculation function for calculating a value by dividing the difference intensity of an arbitrary frame of the plurality of frames by the difference intensity for the plurality of frames summed by the summing function, and a first output function for outputting an extracted image of a moving body in the arbitrary frame based on the value calculated by the second calculation function.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

In the following, an embodiment of the present invention will be described with reference to the attached drawings. The following descriptions pertain to the embodiment of the present invention and are not intended to limit the present invention.

Figure 1:
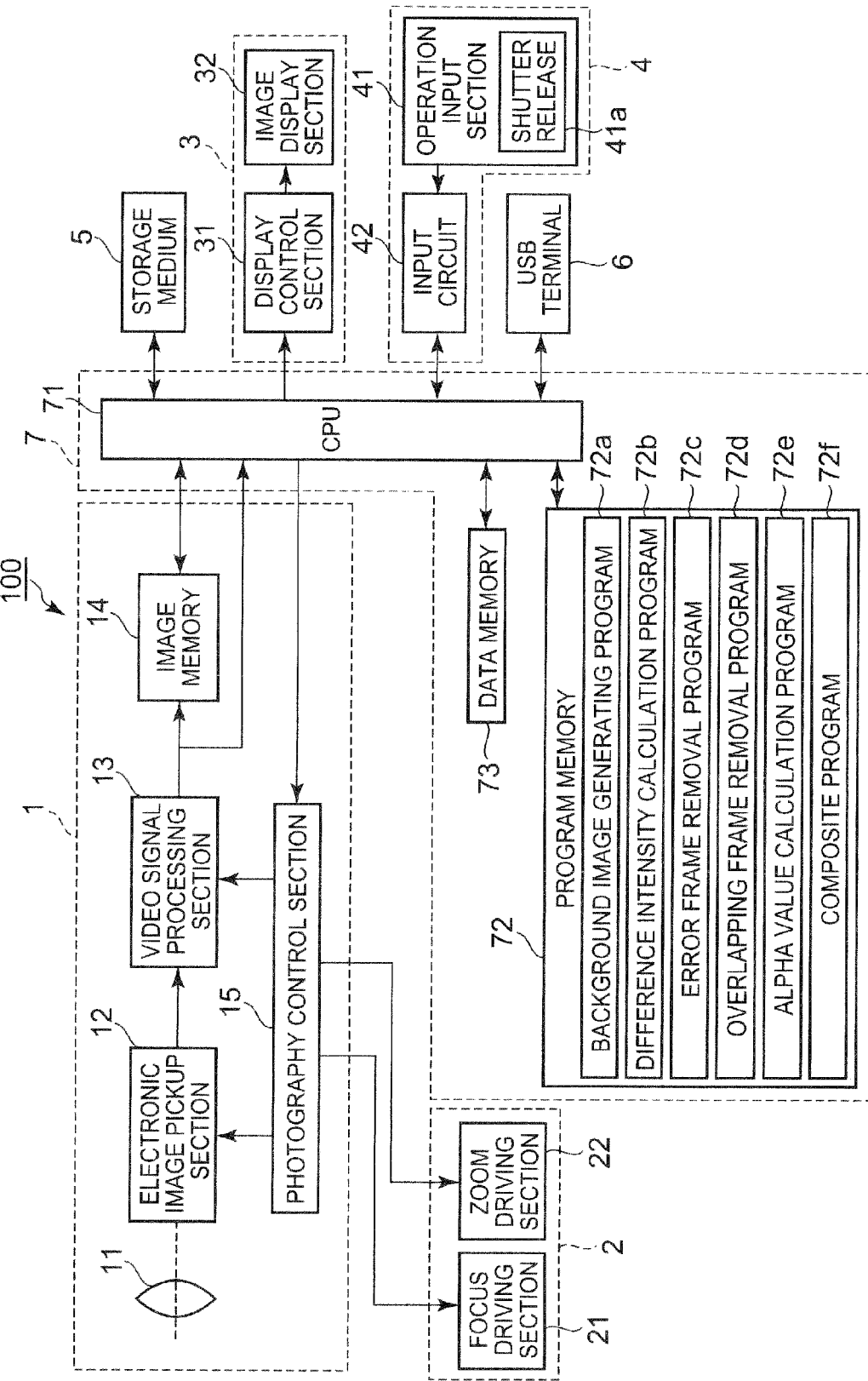
FIG. 1 is a block diagram showing an outline configuration of an image pickup device in an embodiment that adapted the present invention.

FIG. 1 is a block diagram showing an outline configuration of an image pickup device 100 in the embodiment that adapted the present invention. The image pickup device 100 calculates, for each pixel, difference intensity relating to a background portion with respect to a plurality of input frame (F[0], F[1], . . . F[N−1.]). The image pickup device 100 calculates an alpha value by dividing the difference intensity of an arbitrary frame of the plurality of frames by difference intensity for the plurality of frames and outputs an extracted image Gm of a moving body in the arbitrary frame based on the alpha value.

Specifically, as shown in FIG. 1, the image pickup device 100 is composed of an image pickup section 1, an image pickup auxiliary section 2, a display section 3, an operation section 4, a storage medium 5, a USB terminal 6, a control section 7, and so on.

The image pickup section 1 continuously performs image pickup of a photographic subject as image pickup means, and generates the plurality of frames. Specifically, the image pickup section 1 is composed of an image pickup lens group 11, an electronic image pickup section 12, a video signal processing section 13, an image memory 14, a photography control section 15, and so on.

The image pickup lens group 11 is composed of a plurality of image pickup lens.

The electronic image pickup section 12 is composed of image pickup elements such as CCD (Charge Coupled Device) or CMOS (Complementary Metal-oxide Semiconductor) for converting a photographic subject image from the image pickup lens group 11 to a two dimensional image signal, and so on.

The video signal processing section 13 performs predetermined image processes to an image signal outputted from the electronic image pickup section 12.

The image memory 14 temporarily stores image signals after performing the image processes.

The photography control section 15 controls the electronic image pickup section 12 and the video signal processing section 13 under control of a CPU 71. Specifically, the photography control section 15 causes the electronic image pickup section 12 to continuously perform the image pickup of the photographic subject at a predetermined time of exposure, and controls the execution of processes for reading out an image signal (frame) from an image pickup region of the electronic image pickup section 12 at a predetermined frame rate.

The image pickup auxiliary section 2 drives when an image pickup of a photographic subject is performed by the image pickup section 1, and includes a focus driving section 21 and a zoom driving section 22, and so on.

The focus driving section 21 drives a focus mechanism section (not shown in figures) connected to the image pickup lens group 11.

The zoom driving section 22 drives a zoom mechanism section (not shown in figures) connected to the image pickup lens group 11.

In addition, the focus driving section 21 and the zoom driving section 22 are connected to the photography control section 15, and are driven under the control of the photography control section 15.

The display section 3 displays an image picked up by the image pickup section 1, and is composed of a display control section 31 and an image display section 32, and so on.

The display control section 31 has a video memory (not shown in figures) for temporarily storing display data suitably outputted from the CPU 71.

The image display section 32 is composed of a liquid crystal display monitor for displaying a predetermined image based on output signals from the display control section 31, and so on.

The operation section 4 performs predetermined operations of the image pickup device 100, and is composed of an operation input section 41 and an input circuit 42, and so on.

The operation input section 41 has a shutter release 41a for instructing an image pickup of a photographic subject to be performed by the image pickup section 1.

The input circuit 42 inputs control signals outputted from the operation input section 41 to the CPU 71.

The storage medium 5 is composed of e.g. a non-volatile memory (a flash memory) of a card type or a hard disk, and so on, and stores data of the images picked up by the image pickup section 1.

The USB terminal 6 is a terminal for connecting to an external device, and transmits and/or receives data through USB cable (not shown in figures), and so on.

The control section 7 controls each section of the image pickup device 100, and is composed of e.g. the CPU 71, a program memory 72, a data memory 73, and so on. The CPU 71 performs various kinds of control actions according to various processing programs for the image pickup device 100 stored in the program memory 72.

The data memory 73 is composed of e.g. a flash memory, and so on, and temporarily stores data processed by the CPU 71, and so on.

The program memory 72 stores the various kinds of programs necessary for operations of the CPU 71. Specifically, the program memory 72 stores a background image generating program 72a, a difference intensity calculation program 72b, an error frame removal program 72c, an overlapping frame removal program 72d, an alpha value calculation program 72e, a composite program 72f, and so on.

The background image generating program 72a is a program to cause the CPU 71 to realize a function relating to a process for generating a background image Gb in which a moving body M is absent, by a pre-processing (described later).

Figure 2:
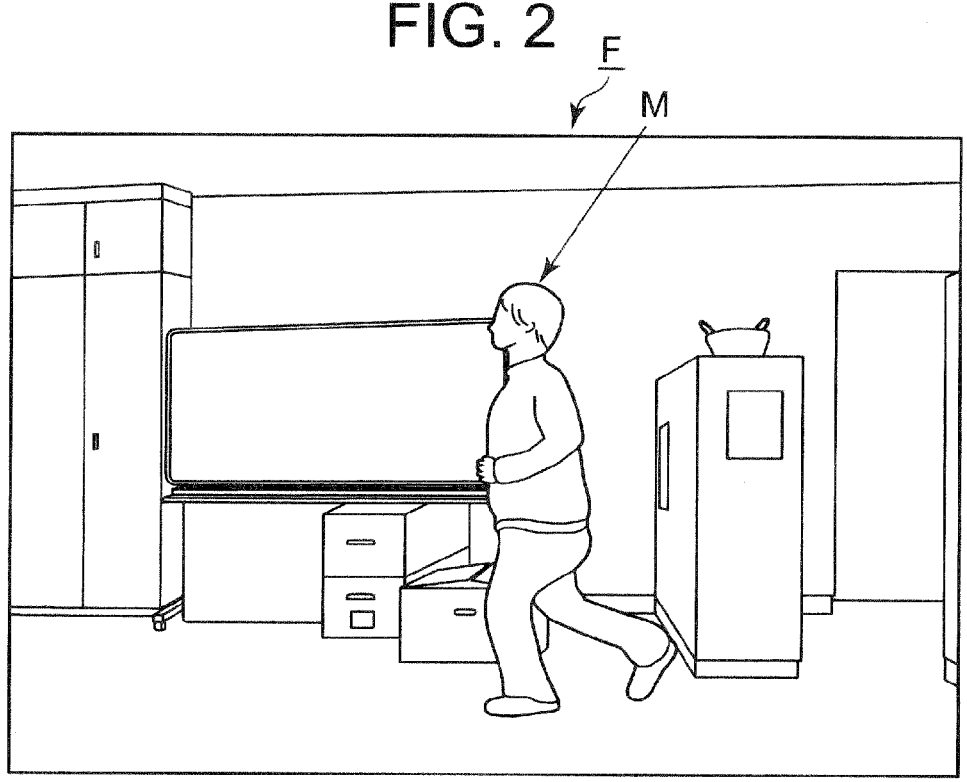
FIG. 2 is a drawing showing a typical example of an image frame relating to an image composition process obtained by the image pickup device shown in FIG. 1.
Figure 3:
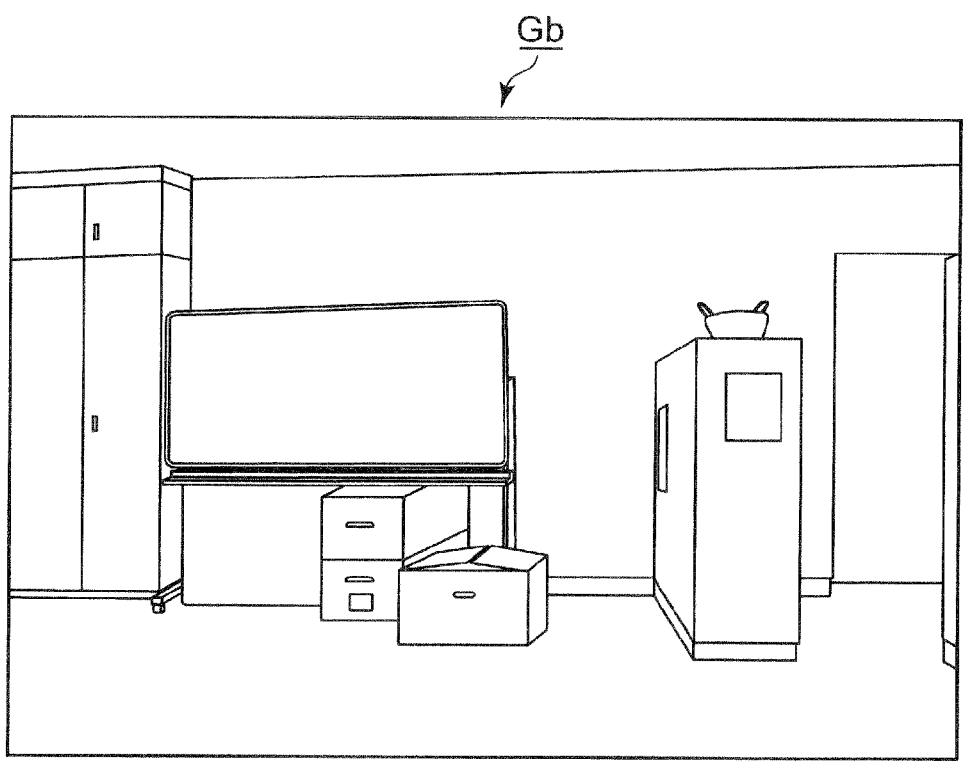
FIG. 3 is a drawing showing a typical example of a background image relating to the image composition process shown in FIG. 2.

That is, the CPU 71 runs the background image generating program 72a, a process for generating a virtual background image Gb (see FIG. 3) is performed using reduced image frames (hereinafter, referred to as frame) of continuous shoot images (see FIG. 2; in addition, F represents one image among the continuous shoot images as shown in FIG. 2) and based on the majority rule. Specifically, when aimed at monochrome image, median (medium value) of pixel values of the same coordinate of all frames is obtained for each pixel. Also, when aimed at color image, since median of vector can not be obtained, median is obtained for each component of a color space as defined in the following formula (1). Here, p-th full size original image to be inputted is set to F'[p], and p-th frame obtained by reducing the p-th full size original image to a predetermined size is set to F[p]. Further, a pixel value of coordinate (x,y) of the frame F[p] is set to F[p,x,y]. Also, $C \in \{Y, Cb, Cr\}$ is a subscript representing a color component. Y is brightness, and Cb and Cr are color differences. Thereby, $F_C[p,x,y]$ represents each color component of F[p,x,y].

$$Gb_C[x,y] = Med_{p \in C} F_C[p,x,y] \qquad (1)$$

An image without the moving body M, which is preliminary photographed, may be designated as a background image Gb.

The difference intensity calculation program 72b is a program to cause the CPU 71 to realize a function relating to a difference intensity calculation process for calculating difference intensity relating to a background portion with respect to a plurality of frames.

That is, the CPU 71 runs the difference intensity calculation program 72b, and a process for calculating the difference intensity of the background image with respect to a plurality of frames. Specifically, original difference intensity (array Do[p]) is calculated by calculating a sum of squares with weight of a color component of an image of each frame according to the following formula (2). Here, each the background image is represented by Gb.

$$D_O[p,x,y] = \{Gb_Y[x,y] - F_Y[p,x,y]\}^2 + w\{Gb_{Cb}[x,y] - F_{Cb}[p,x,y]\}^2 + w\{Gb_{Cr}[x,y] - F_{Cr}[p,x,y]\}^2 \qquad (2)$$

Also, when the difference intensity is represented by 8 bit values, it is necessary to clip it to the maximum value 255. Especially, in the square value, since it becomes very large value, it is better to shift it to small digit by several digits, and clip it to 255.

Also, the weight constant w of the color difference component can be empirically determined. In many cases, with respect to the weight constant w, 1 is sufficient, but since it does not depend to w so sensitively, two or more is desirable because some favorable result can be obtained.

Also, as a color space, though Y, Cb, and Cr that are used in a process of JPEG are used in this embodiment, it is possible to use a transformed color space.

Figure 4:
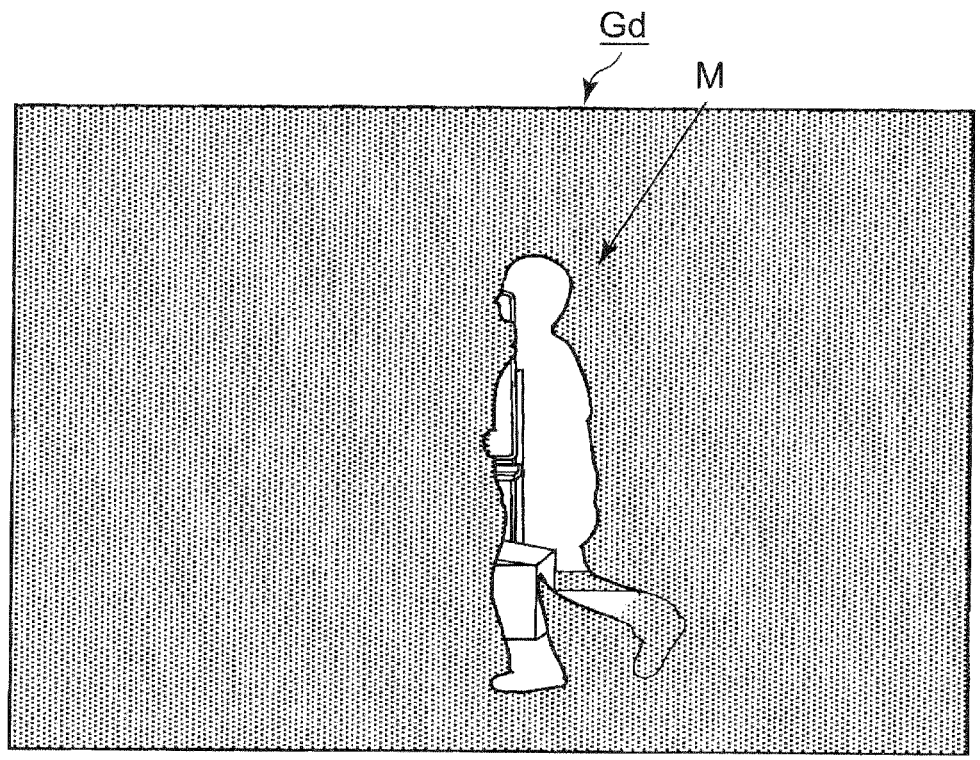
FIG. 4 is a drawing showing a typical example of a gray scale image representing original difference intensity relating to the image composition process shown in FIG. 2.

Here, FIG. 4 shows a gray scale image Gd representing an original difference intensity calculated by the formula (2). As shown in FIG. 4, the unevenness of the intensity occurs in an interior of the moving body M by influences such as a frame of the white board or a carton box, and so on of the background in the inputted original image (see FIG. 2). Also, since the one leg portion and the wall of the background have similar pixel values, the image portion becomes very thin.

Also, the original difference intensity (array Do[p]) can obtained by performing calculation using an absolute value sum with weight of the color component of the image of each frame by the following formula (3).

$$D_O[p,x,y] = |Gb_Y[x,y] - F_Y[p,x,y]| + w|Gb_{Cb}[x,y] - F_{Cb}[p,x,y]| + w|Gb_{Cr}[x,y] - F_{Cr}[p,x,y]| \qquad (3)$$

Also, in the difference intensity calculation process, in order to calculate various kinds of parameters to be used for a normalization process of difference intensity, an error frame decision process, and a background intensity calculation process which are described later, Otsu's binarization process is performed to the original difference intensity (adaptive binarization process). Here, Otsu's binarization is a kind of discriminant analysis method by degree in separation for separating a group on the basis of a class internal variance. By this method, a histogram of sample values is obtained, and remaining processes can be processed at very high speed by only scanning the histogram.

Also, by Otsu's binarization, a threshold value $t_p$ to be used to separate the group to two sets of a group near 0 and a group near 1 is set. Accordingly, it may be considered that it is ideally separated into the background portion being 0 and the moving body portion. However, the boundary of the threshold value $t_p$ is not necessarily set to outline of the moving body M as it is. It is only separated into a group of typical difference value and portions of values more than it among the moving body portion, and the moving body portion having difference value fainter than it may be left.

Further, a background medium value $z_p$, a moving body medium value $m_p$ and a noise level estimate value $n_p$ defined in the following formulas (4) to (6) are extracted by utilizing a result of the binarization and stored. Here, $z'_p$ is a 25-th percentile value from the top of the background set.

$$z_p = Med_{D_O[p,x,y] < t_p} D_O[p,x,y] \qquad (4)$$

$$m_p = Med_{D_O[p,x,y] \geq t_p} D_O[p,x,y] \qquad (5)$$

$$n_p = z'_p - z_p \qquad (6)$$

These values indicate that typical values of the background portion, the moving body portion and amplitudes of the background portion are obtained with respect to the difference intensity. Also, though the noise level estimate value does not indicate some strict value, the noise level estimate value approximates with standard deviation or average deflection of the background portion. The median or a percentile value is easily calculated at high speed from a histogram prepared to obtain the binarization threshold value.

Here, though the noise level estimate value can be calculated using the average or the standard deviation, these are influenced by the outlier value. Since they are not robust measure in a condition that there is no guarantee that the background portion obtained by the binarization cuts out the background correctly, the above mentioned estimation method is used.

In addition, the binarization threshold value $t_p$ is the above mentioned Otsu's binarization threshold value. When the normalization process (mentioned later) is performed, it is preferable to store a value obtained by subtracting $z_p$ from an original threshold value in order to cut out almost same region in the difference intensity after normalization.

A normalization process of the difference intensity is performed, in the difference intensity calculation process, to correct an unbalance, caused by the illumination variation, of a blending ratio of the moving body M at the composition process.

That is, the difference intensity can be regarded as a membership function of a kind of fuzzy set, and represents an ambiguous moving body portion. Here, the fuzzy set is a set by which a degree of the position of the each element called the membership function was defined, and indicates that when the range is set to [0,1], "0" indicates it does not belong to the set at all, and "1" indicates it completely belongs to the set, and an intermediate value indicates it belongs according to degree corresponding to the value. Also, there is no strong restriction about how to determine the intermediate value of the membership function. It should just represent the order of vague degree.

However, the original difference intensity obtained in fact has different direct current offsets and amplitudes in each frame corresponding to degrees of the illumination variation because the difference value is not 0 even if it is the complete background portion (immobility area).

Therefore, in the complete background portion, since the membership should become 0, the background medium value $z_p$ obtained by the adaptive binarization process is subtracted from the difference intensity according to the following formula (7), and the difference intensity is normalized by converting it to the clipped value 0 when the subtracted result is the negative value.

$$D_N[p,x,y]=\max(0,D_O[p,x,y]-z_p) \quad (7)$$

Also, in the normalization process of the difference intensity, though the background medium value $z_p$ is used, it is not limited to this. Since the representative value of the background portion can be used, the mode value or the average value, and so on also can be used.

Also, in the difference intensity calculation process, a smoothing process for the difference intensity is performed in order to erase a fine deficit and an isolated point resulting from noise or a thin edge resulting from small camera shake Here, the smoothing process is performed by a morphology operation, and this technique is often used in the binarization process and can be regarded as a kind of smoothing process.

In addition, in this embodiment, though the smoothing process is performed by a multiple-valued morphology operation, erosion and dilation processes of the multiple-valued morphology operation are based on Min and Max operations, and this can be regarded as a kind of the fuzzy operation. Specifically, according to the following formula (8), after closing (erosion→dilation) is performed to the difference intensity, opening (dilation→erosion) is performed.

$$D[p]=\text{Opening}(\text{Closing}(D_N[p])) \quad (8)$$

Also, a smoothing process is not limited to the above mentioned method.

The error frame removal program 72c is a program that causes the CPU 71 to realize a function relating to a process for removing an error frame having a possibility that a part of background is extracted in error because the moving body M is not correctly extracted from the valid frame. Here, especially, a frame being only background in which the moving body M do not exist provides large influence and makes a problem. For example, the problem occurs when the moving body M exists outside the frame or when occlusion (concealment) occurs. In this case, all difference value of background should be 0 ideally. If this frame is separated to two groups forcedly, the binarization threshold value becomes very small and the extracted area of the background becomes large abnormally.

Therefore, the number of points having difference intensity not less than the binarization threshold value calculated by the adaptive binarization process is counted to obtain an area of the moving body portion, and whether a ratio to the whole screen of a value of the area is within a predetermined range is judged. Here, when it is judged that the ratio to the whole screen of the moving body portion value is not within the predetermined range, it may be an error frame. Actually, although extremely big moving body portion may exist, the error frame usually occurs when the moving body M did not exist in the frame or when the moving body M becomes very small area by occlusion.

Also, though the minimum value and the maximum value of range for judging the area ratio are preset, it is possible to set a loose restriction e.g. 0 to ¼ of all screen regions if it is desirable not to limit the application range as much as possible.

Also, it is possible to perform the decision processing immediately after performing the adaptive binarization process.

After that, binarization threshold values for all frames are obtained and the median of the threshold values is calculated. It is considered that this median value is a typical value of correct value because it is not usually considered that frames which are not less than half of the number of frames are backgrounds. Then, as compared with median value, for example, whether there is a frame having a threshold value not more than ⅒ or not is judged. Here, when it is judged that there is the frame having the threshold value not more than ⅒, the frame may be the error frame. Actually, extremely small threshold value is sometimes generated, and this happens when the moving body M did not exist in the frame or the moving body M becomes very small area by occlusion.

That is, it can be judged that extracted one is not the moving body M, since the extreme differences about the threshold value do not occur by the illumination variation, such as the fluorescent light, unless extreme ultra high-speed (super-short time exposure) photography is premised.

The overlapping frame removal program 72d is a program that causes the CPU 71 to realize a function relating to an automatic thinning out process by judging, with respect to a plurality of valid frames, a frame (overlapping frame) in which a region overlapping to other frame is large with respect to the moving body portion.

Figure 5:
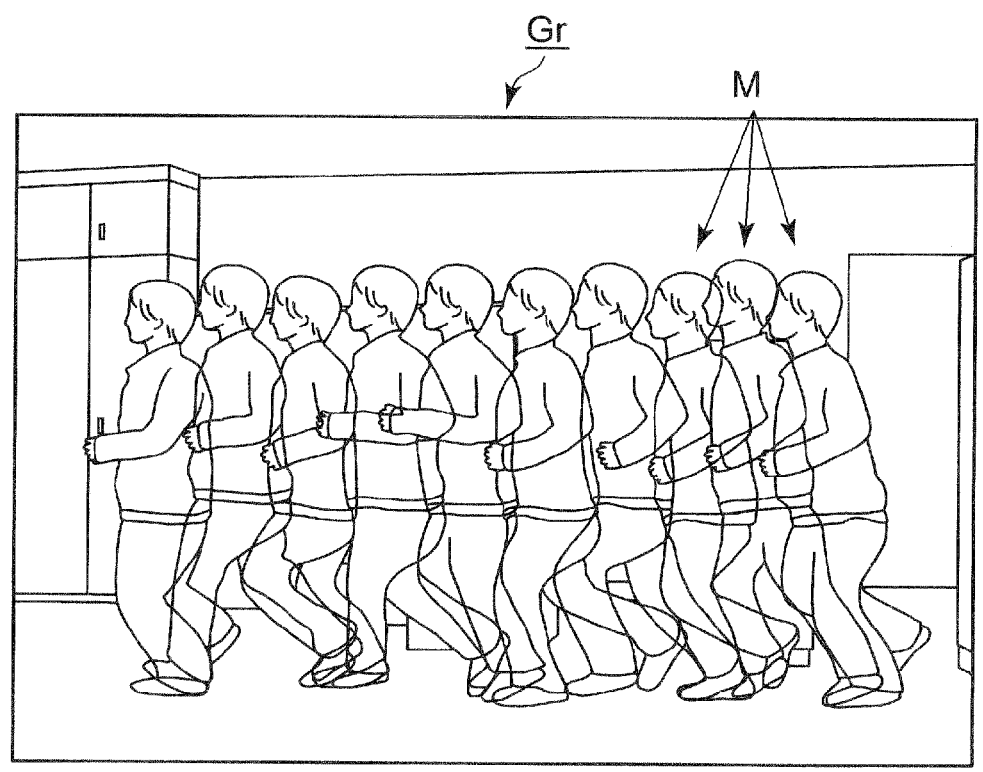
FIG. 5 is a drawing showing a typical example of a composite image relating to the image composition process shown in FIG. 2.

An disadvantage of combining by the blending is that it does not have the concept of the time series in display of the moving body M. Accordingly, especially, when the motion is slow or when the motion is temporary in the stay state, the motions of the object can not be easily understood when all frames are overlapped (overlapping image Gr; see FIG. 5).

Therefore, the background portion and the moving body portion in a frame are separated based on the binarization threshold value calculated by the binarization process. Then, the overlapping frame is judged according to whether the ratio is more than the predetermined threshold value on the basis of an area ratio of an area (pixel number) of the moving body portion and a moving body overlapping area (pixel number). Specifically, a moving body overlapping area ratio of an image p and an image q is represented by r(p,q) according to the following formula (9). The object in Σ of the following formula (9) is described in a two valued logical expression. Then this means that its logical value 1 for "truth" or 0 for "false" is added to sum. Then, when the area ratio is not less than the predetermined threshold value, any one frame (for example, the frame later in time) of image p and image q is removed from the valid frame set.

$$r(p, q) = \frac{\sum_{x,y}\{(D[p, x, y] > t_p) \text{ and } (D[q, x, y] > t_q)\}}{\sum_{x,y}(D[p, x, y] > t_p)} \quad (9)$$

Figure 7:
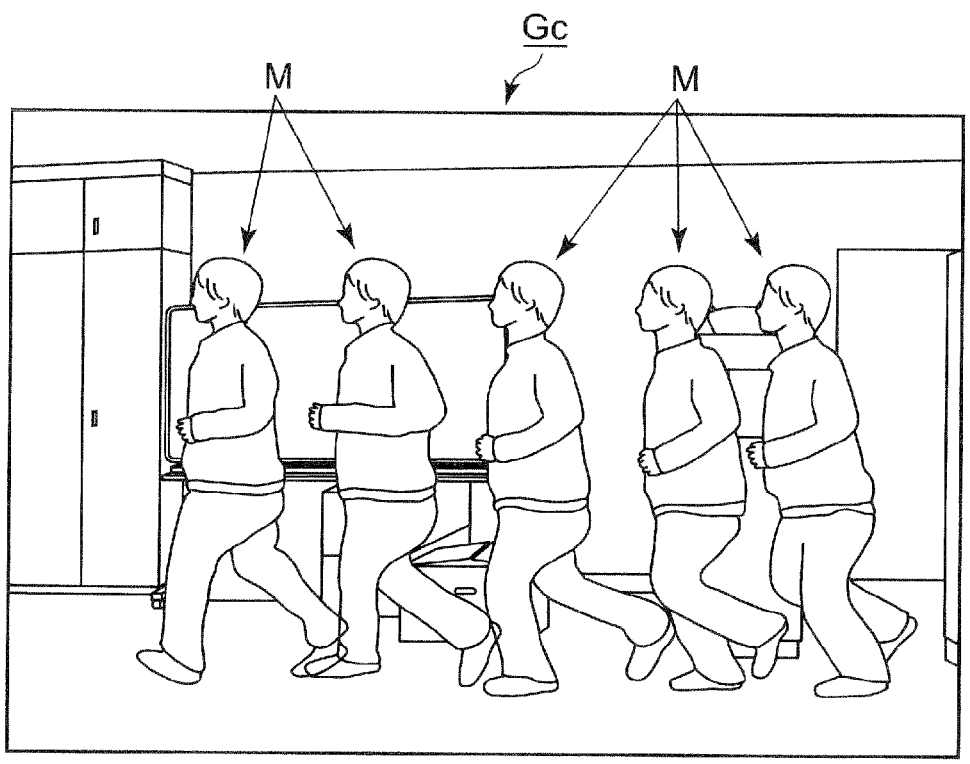
FIG. 7 is a drawing showing a typical example of a composite image relating to the image composition process shown in FIG. 2.

Here, in the process, by the setup of threshold value, it can adjust how much overlap is allowed That is, though it is also based on subjective favorite, when the overlap of one to several tens percent is allowed positively, the composite number of frames is increased and the composite image Gc impressing speediness can be obtained (see FIG. 7).

Also, the boundary by the binarization threshold value does not necessarily show an exact moving body boundary.

However, from the viewpoint that some overlap of the moving body M is allowable, it is considered that inexact boundary will not lead so bad result.

The alpha value calculation program 72e is a program that causes the CPU 71 to realize a function relating to a process for calculating an alpha value A being a blending ratio of a plurality of valid frames. Specifically, the CPU 71 runs the alpha value calculation program 72e, and the alpha value is calculated according to the following formula (10). The alpha value is obtained by dividing difference intensity of one arbitrary frame of a plurality of the valid frames by difference intensity obtained by summing a plurality of valid frames.

$$A[p, x, y] = \frac{D[p, x, y]}{\sum_{p \in V} D[p, x, y]} \quad (10)$$

Here, in the formula (10), a result becomes error when denominator is 0, and a result becomes instable when denominator is near 0. Also, the error is avoidable by performing recalculation after forcibly changing the difference intensity of any valid frame to 1 when denominator is 0. However, the instability will remain. Superiority about frames will change according to instability by small noise change. Especially, when there is the illumination variation, it will be conspicuous that background is selected from various frames.

Therefore, in the background portion, a correction process is performed by the background intensity at a preceding stage of the alpha value calculation in order to become insensible to little change like noise as a result.

Specifically, a composite noise level is estimated using noise level estimate value $n_p$ calculated by the adaptive binarization process (see the following formula (11)).

$$n_c = \sqrt{\sum_{p \in V} n_p^2} \quad (11)$$

That is, under the assumption that noises of same pixel positions do not correlate between frames, distribution of noise in the summed result for denominator of the alpha value is a sum of distribution of noise in each frame. That is, as above mentioned, since the noise level estimate value is not widely different from the standard deviation, it is possible to estimate the composite noise level which approximated the standard deviation of denominator by the root sum square value of noise level. Here, strictly, the noise is not only pure random noise. That is, a correlation remains, because the background image Gb used as a reference has a dependency since it is calculated by median of each frame, and a relationship by background contents remains, since the illumination variation is corrected by only the difference with the background medium value in normalization process, the relationship by background contents remains. However, on the contrary, when there is strong relationship about noises of same pixel positions between frames, it is possible to estimate noise amplitude of denominator of the alpha value as the sum of noise amplitude for each frame (that is, a simple sum of noise levels). Typically, the noise amplitude of denominator of the alpha value is only the difference in a degree which becomes large several times. Also, even if this estimate is strictly performed, it seems that it is almost ineffective actually. Accordingly, it is enough to use the above mentioned method.

The denominator minimum value of the alpha value is defined as $\alpha_{min} = k n_c$. Here, k is suitable constant value and it becomes more insensible to noise when this constant value becomes large. Specifically, for example, it is near 3.

Then, when denominator is smaller than the value of several time of the estimate value of the composite noise level, it is considered that the region has some degree in the background portion. That is, background intensity being intensity of fuzzy background is defined according to the following formula (12).

$$B[x, y] = \max\left(0, \alpha_{min} - \sum_{p \in V} D[p, x, y]\right) \quad (12)$$

Here, in the area where the background intensity is more than 0, the moving body M may not clearly exist in any frame, that is, the area is an area where the difference intensity changes at noise level or at small level equivalent to noise. In these areas, an alpha value of a pixel value of any frame is made high according to intensity (weakness of the moving body existence) of the background intensity. Also, since a frame to be selected as a background will become a region being background, any one can be selected, and the frame can be divided proportionally by a plurality of frames. The simplest method is to select a first valid frame among the frames.

Then, an index of a frame to be selected as background is set to b, values of difference intensity of all pixel positions are updated according to the following formula (13). Subsequently, as above mentioned, an alpha value of each pixel of each valid frame $p \in V$ is calculated according to the formula (10).

$$D[b,x,y] = D[b,x,y] + B[x,y] \quad (13)$$

The correction of the alpha value calculation algorithm cannot spoil the continuity of the composite result to the input, but it can make it good rather.

Figure 6:
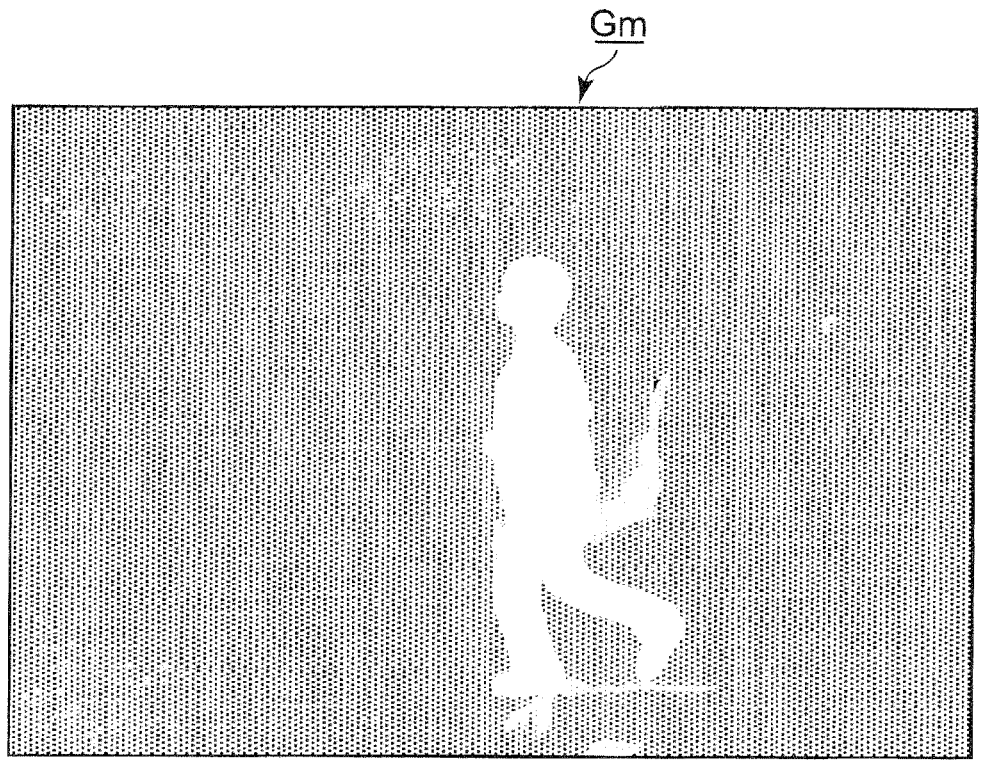
FIG. 6 is a drawing showing a typical example of an extracted image relating to the image composition process shown in FIG. 2.

As shown in FIG. 6, under the assumption that the alpha values are regarded as a fuzzy area, the extracted image Gm of the moving body in an arbitrary frame is composed of the moving body portion, surrounding area including shadow of the moving body M, and background noise. The unevenness inside the moving body M in the gray scale image Gd (see FIG. 4) showing the original difference intensity becomes smooth here.

The composite program 72f is a program that causes the CPU 71 to realize a function relating to a composition process for combining a plurality of valid frames.

First, the CPU 71 runs the composite program 72f, and A'[p] is obtained by performing upscale of an alpha value A[p] calculated for each pixel of a reduced image to a full size. Here, though the interpolation process between the nearest pixels can be performed, it is preferable, for an image quality, to sequentially (more preferably, smoothly) interpolate by the bilinear interpolation, and so on. For example, by a method of this embodiment, though the jaggy does not occur (ideally) in boundary between a single moving body and a background, the jaggy may occur between a plurality of moving bodies or between a moving body and a background having large background intensity. Since it is a multiple value process, lightness difference by jaggy is small in comparison with the binarization process, and the jaggy is not conspicuous even if the interpolation process between the nearest pixels is performed without performing other processes. However, it is considered that the way of more sophisticated interpolation is better to make lightness difference smaller.

Further, a frame to be combined is generated by multiplying each pixel value of each of a plurality of valid frames by the alpha value A'[p]. Then, the composite image Go is obtained by combining these frames (see FIG. 7).

A pixel value of a composite image Gc is calculated according to the following formulas (14) to (16). The alpha value is assumed as real number. In case of using integer multiplied by constant value as the alpha value, division is performed by the suitable shift. Also, color difference value is expressed by unsigned 8 bit, it assumes that it is 128 at the time of the colorlessness. Also, a full size input image is set to F'[p].

$$Gc_Y[x, y] = \sum_{p \in V} A'[p, x, y] * F'_Y[p, x, y] \quad (14)$$

$$Gc_{Cb}[x, y] = 128 + \sum_{p \in V} A'[p, x, y] * (F'_{Cb}[p, x, y] - 128) \quad (15)$$

$$Gc_{Cr}[x, y] = 128 + \sum_{p \in V} A'[p, x, y] * (F'_{Cr}[p, x, y] - 128) \quad (16)$$

Next, the image composition process in this embodiment is explained in detail in view of FIG. 8 to FIG. 15.

Figure 8:
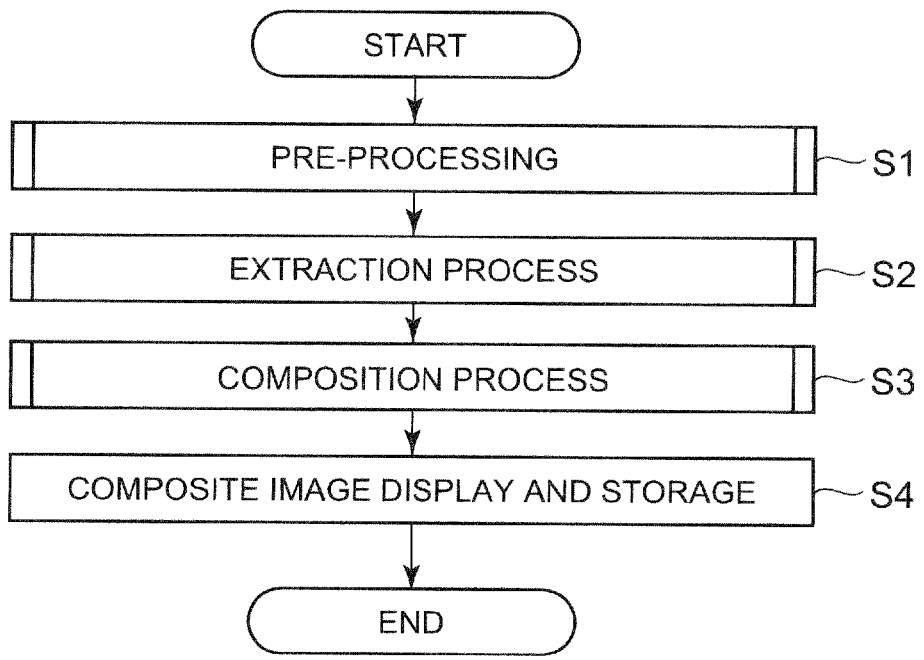
FIG. 8 is a flowchart showing an example of operations relating to the image composition process shown in FIG. 2.

FIG. 8 is a flowchart showing an example of operations relating to the image composition process. As shown in FIG. 8, a pre-processing is performed before this process of image composition (step S1). After that, an extraction process is performed to extract a moving body portion from each of a plurality of image frames obtained by the continuous shoot (step S2). Further, a composition process is performed to combine a plurality of valid frames on the basis of an alpha value of each image frame (step S3), and the composite image Gc is displayed and stored as composition result (step S4).

Figure 9:
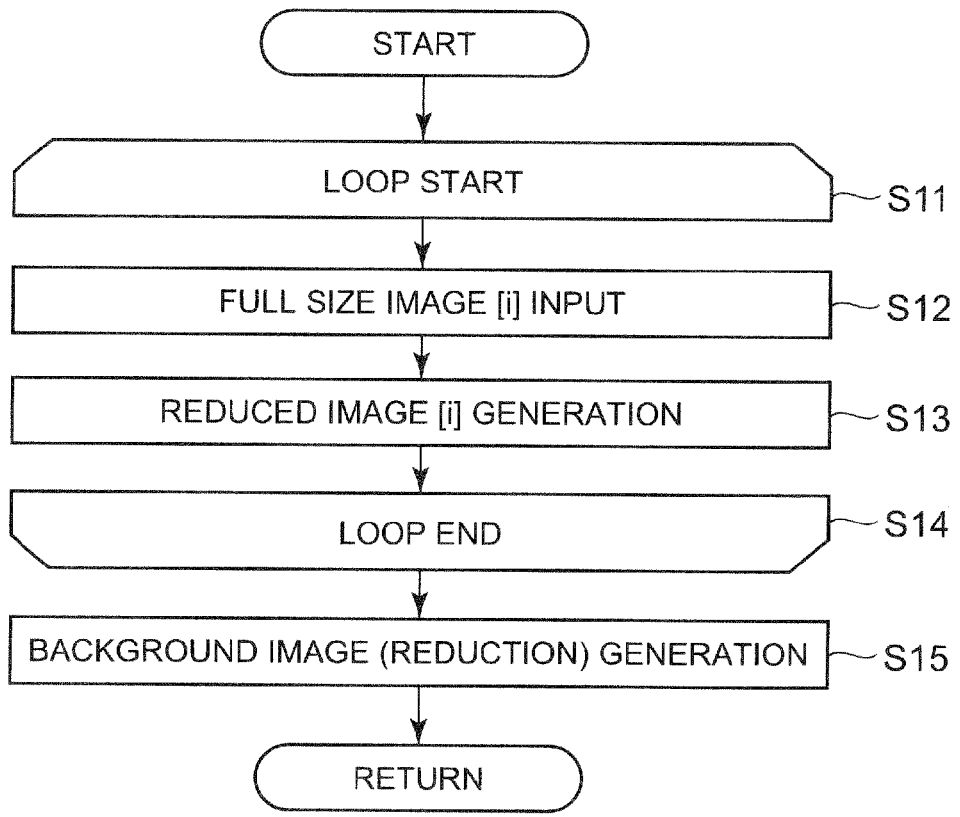
FIG. 9 is a flowchart showing an example of operations relating to a pre-processing of the image composition process shown in FIG. 8.

Next, the pre-processing is explained in detail in view of FIG. 9.

FIG. 9 is a flowchart showing an example of operations relating to the pre-processing of the image composition process. As shown in FIG. 9, in the pre-processing, the CPU 71 generates reduced images with respect to a plurality of inputted image frames (N frames) by loop (steps S11 to S14).

Specifically, the CPU 71 inputs (obtain) a full size original image F'[p] of each frame with respect to frames of N frames (image number i="0" to "N–1") (step S12). Further, after applying a suitable low filter to the inputted (obtained) image, subsampling is performed to change it to a predetermined size being 1/several of a size of the image, and a reduced image F[p] the number of pixels of which is reduced is generated (step S13).

The above processes are repeatedly performed up to N-th frame being the image number i=N–1 (step S14), the CPU 71 runs the background image generating program 72a in the program memory 72, and generates a virtual background image Gb by using the reduced images of the generated continuous shoot images based on the majority rule (step S15). Then, the pre-processing is ended.

Next, the extraction process is explained in detail in view of FIG. 10 to FIG. 14.

Figure 10:
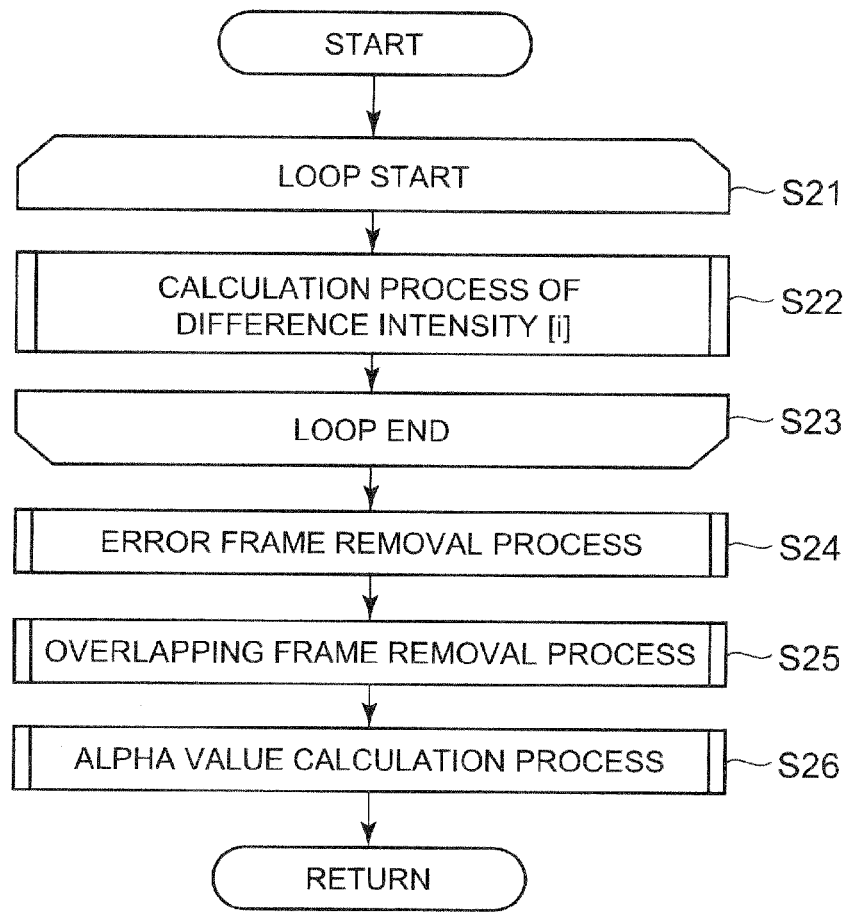
FIG. 10 is a flowchart showing an example of operations relating to an extraction process of the image composition process shown in FIG. 8.

FIG. 10 is a flowchart showing an example of operations relating to the extraction process of the image composition process. As shown in FIG. 10, in the extraction process, first, the CPU 71 calculates difference intensity with respect to n frames (image number i="0" to "N–1") by loop (steps S21 to S23). Next, the CPU 71 performs an error frame removal process for removing an error frame(s) from valid frames (step S24). Then, the CPU 71 continuously performs an overlapping frame removal process for removing an overlapping frame(s) which largely overlaps with other frame with respect to the moving body portion (step S25). Subsequently, the CPU 71 performs an alpha value calculation process for calculating an alpha value being a blending ratio of a plurality of valid frames (step S26).

Hereinafter, the difference intensity calculation process is explained in detail in view of FIG. 11.

Figure 11:
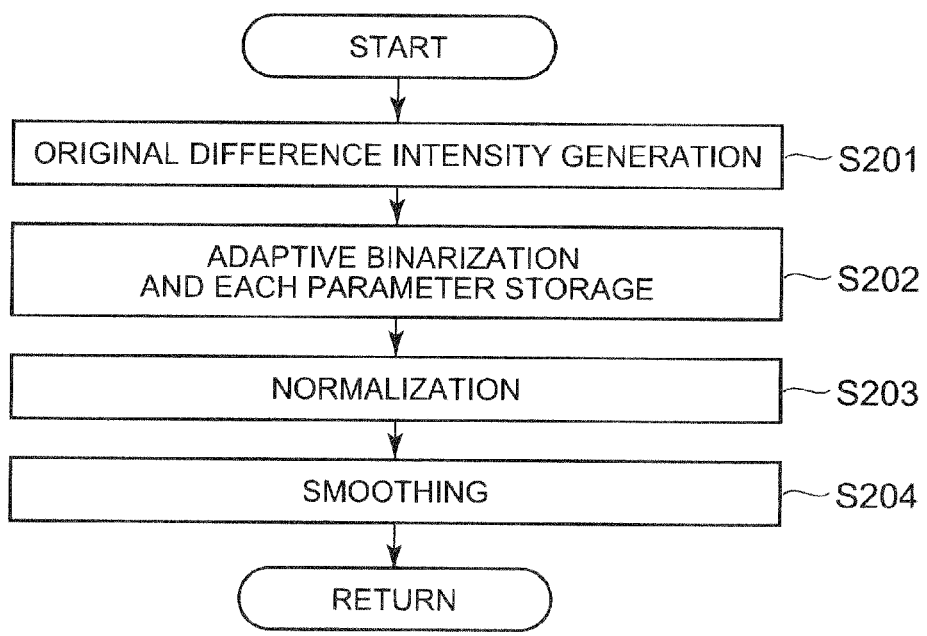
FIG. 11 is a flowchart showing an example of operations relating to a difference intensity calculation process of the extraction process shown in FIG. 10.

As shown in FIG. 11, in the difference intensity calculation process, the CPU 71 runs the difference intensity calculation program 72b in the program memory 72, calculates a sum of squares with weight of color components of an image with respect to a plurality of frames, and calculates original difference intensity (step S201). Continuously, the CPU 71 performs Otsu's binarization process (adaptive binarization process) to the calculated original difference intensity, and calculates and stores a background medium values a moving body medium value and a noise level estimate value as various kinds of parameters used in a background intensity calculation process, a normalization process of the difference intensity and an error frame decision process (step S202).

Then, the CPU 71 performs the normalization process of the difference intensity and corrects unevenness of depth of the blending ratio of the moving body M to be generated when combining it based on the illumination variation (step S203).

Next, the CPU 71 performs a smoothing process of the difference intensity, and removes fine deficit and isolated points caused by noise and/or thin edge caused by small camera shake (step S204).

Then, the difference intensity calculation process is ended.

Hereinafter, the error frame removal process is explained in detail in view of FIG. 12.

Figure 12:
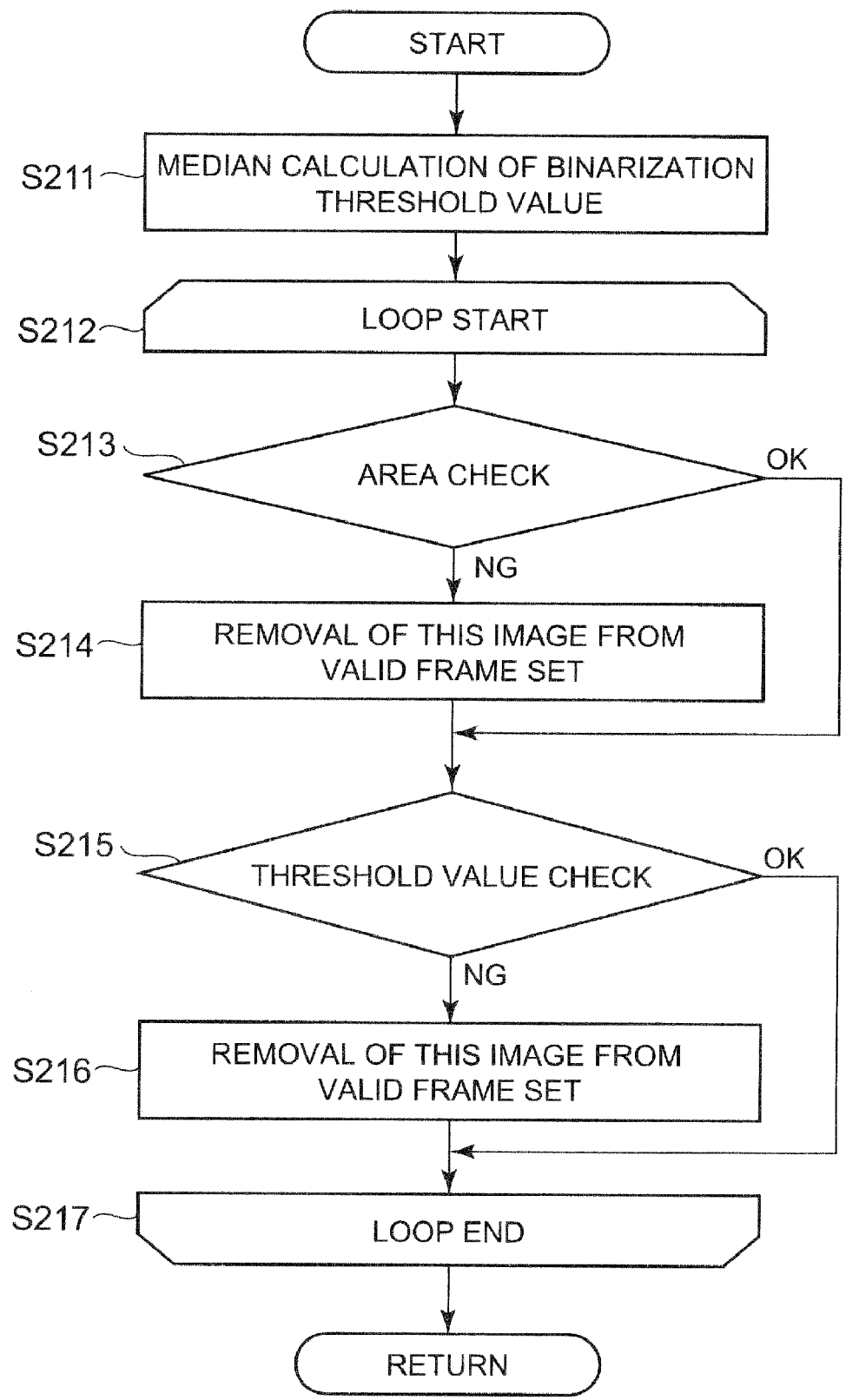
FIG. 12 is a flowchart showing an example of operations relating to an error frame removal process of the extraction process shown in FIG. 10.

As shown in FIG. 12, in the error frame removal process, first, the CPU 71 runs the error frame removal program 72c in the program memory 72, and calculates median of a binarization threshold value in all frames calculated in the adaptive binarization process (step S211). Continuously, the CPU 71 performs judgment and removal of error frames with respect to N frames (image number i="0" to "N–1") by loop (steps S212 to S217).

Specifically, the CPU 71 counts the number of points having difference intensity not less than the binarization threshold value with respect to each frame F[i] (i=0, 1, 2 . . . N–1), calculates an area of the moving body, and judges whether a ratio of the area to the whole frame is within a predetermined range (step S213). Here, when it is judged that the area ratio is not within the predetermined range (step S213; NG), the CPU 71 removes the frame F[i] as an error frame from a valid frame set (step S214).

Next, the CPU 71 judges (checks) whether frame F[i] judged as "OK" in step S213 has a small threshold value not more than e.g. about 1/10 of a median value of binarization threshold value (step S215). Here, when it is judged that frame F[i] has small threshold value not more than about 1/10 (step S215; NG), the CPU 71 removes the frame F[i] as an error frame from the valid frame set (step S216).

The above processes are repeatedly performed up to N-th frame being the image number i=N–1 (step S217), and the error frame removal process is ended.

Hereinafter, the overlapping frame removal process is explained in detail in view of FIG. 13.

Figure 13:
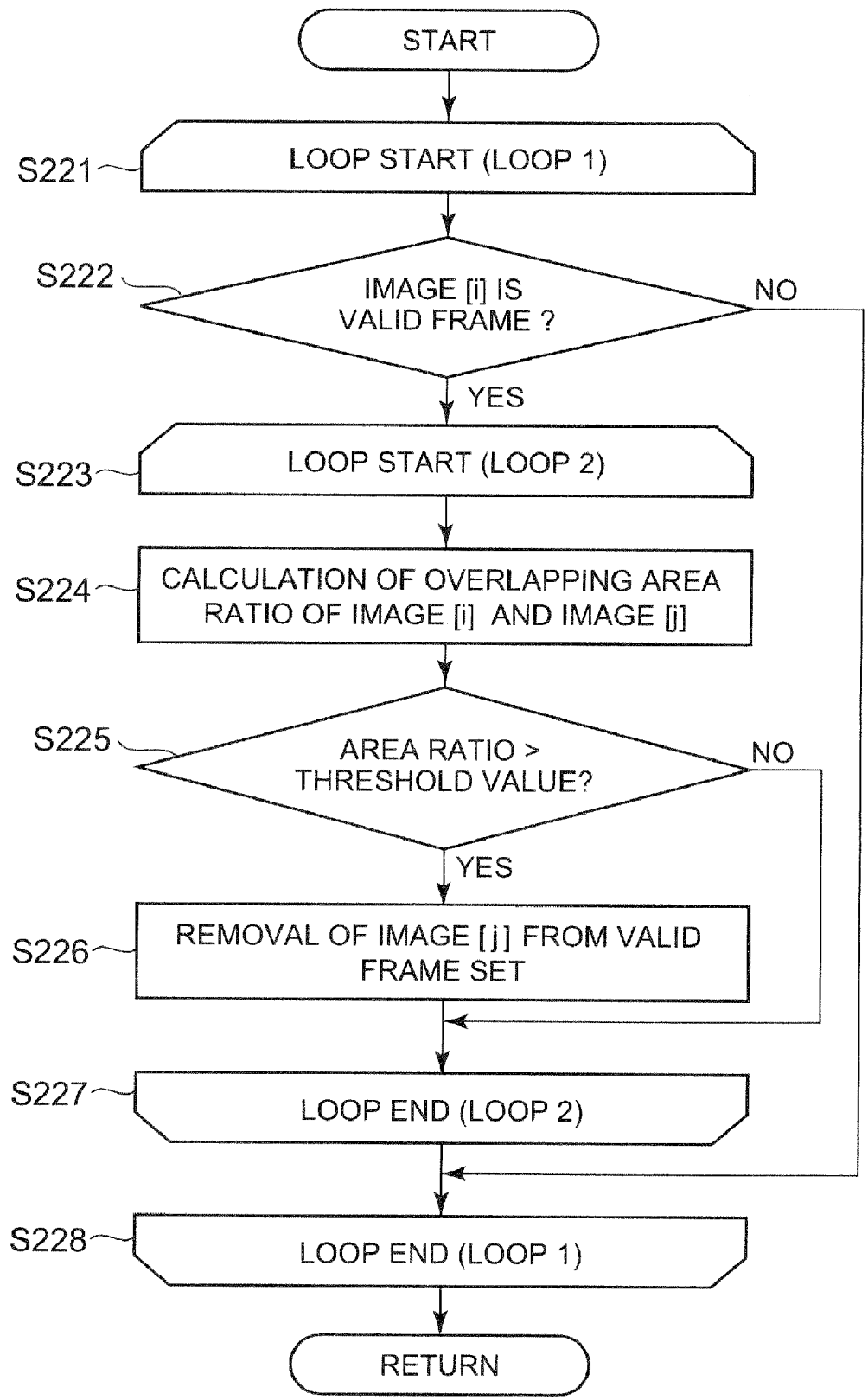
FIG. 13 is a flowchart showing an example of operations relating to an overlapping frame removal process of the extraction process shown in FIG. 10.

As shown in FIG. 13, in the overlapping frame removal process, the CPU 71 runs the overlapping frame removal program 72d in the program memory 72, judges whether other overlapping frame exists with respect to N–1 frames (image number i="0" to "N–2"), and performs a thinning process by loop (loop 1) (steps S221 to S228).

Specifically, first, the CPU 71 judges whether frame F[i] is a valid frame with respect to N–1 frames (image number i="0" to "N–2") (step S222). Here, when it is judged that frame F[i] is the valid frame (step S222; YES), the CPU 71 judges whether frame F[j] and frame F[i] are overlapping frames and performs a thinning process by loop (loop 2, a range of j is "i+1" to "N−1") relating to the image number j (steps S223 to S227). That is, the CPU 71 calculates an area ratio of the moving body overlapping area to an area of the moving body portion in the image frame [i] and the next image frame [j] (step S224). Then, the CPU 71 judges whether the area ratio is lager than a predetermined threshold value or not (step S225).

Here, when the CPU 71 judges that the area ratio is lager than the predetermined threshold value (step S225; YES), the CPU 71 removes frame [j] from the valid frame set (step S226).

The overlapping frame removal process is ended by performing the processes repeatedly up to the N−1-th frame being the image number i=N−2 (step S228).

Hereinafter, the alpha value calculation process is explained in detail in view of FIG. 14.

Figure 14:
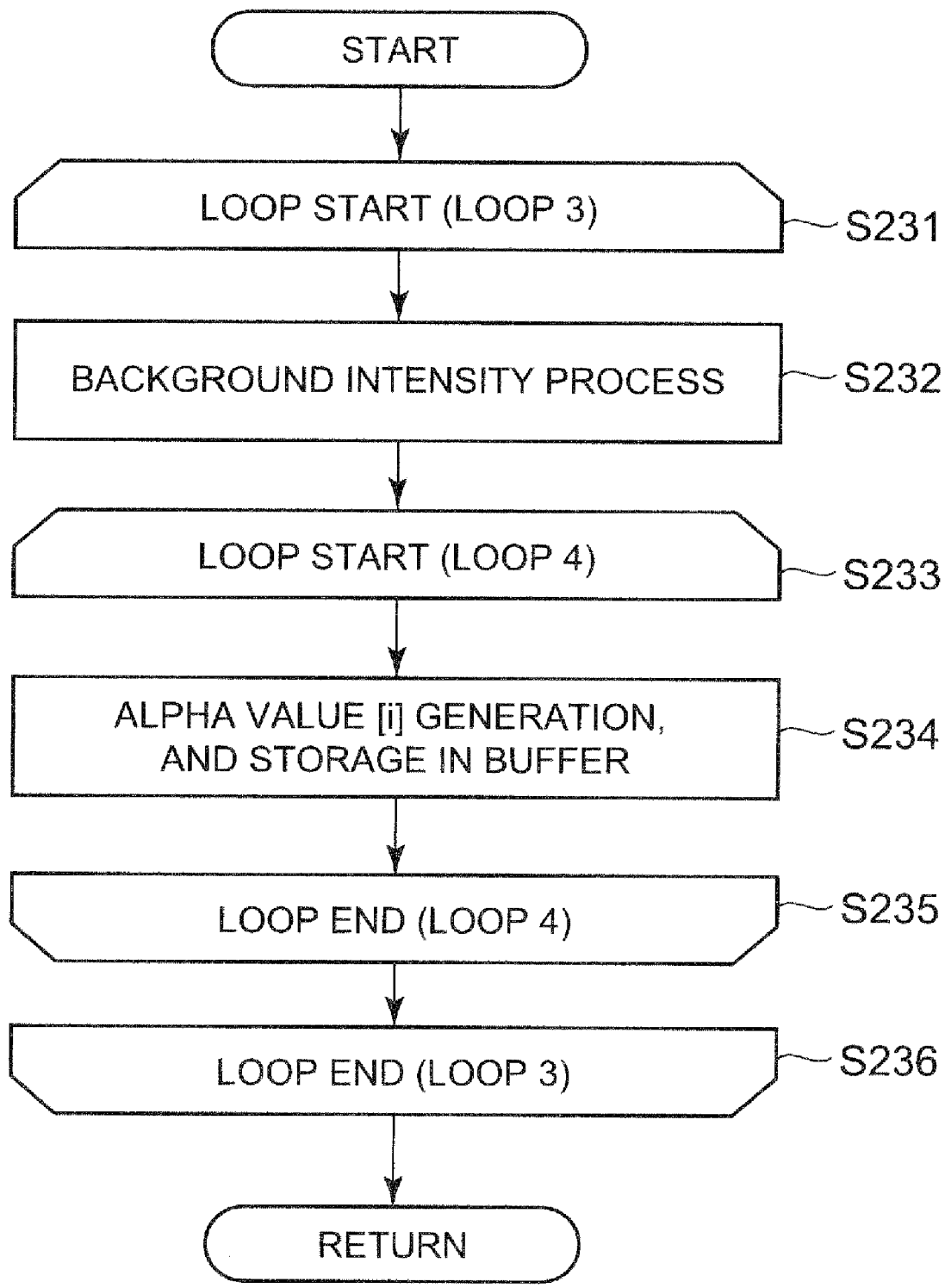
FIG. 14 is a flowchart showing an example of operations relating to an alpha value calculation process of the extraction process shown in FIG. 10.

As shown in FIG. 14, in the alpha value calculation process, the CPU 71 runs the alpha value calculation program 72c in the program memory 72, calculates background intensity, and generates a alpha value with respect to the frame F[i] of N frames (image number i "0" to "N−1") (steps S231 to S236).

Specifically, first, the CPU 71 starts loop (loop 3) relating to a pixel position, calculates background intensity with respect to each pixel position of frame to be selected as background, and updates difference intensity value of each pixel position by the background intensity (step S232).

Then, with respect to N frames (image number i="0" to "N−1"), the CPU 71 generates the alpha value by loop (loop 4) (steps S233 to S235). Specifically, with respect to each of a plurality of valid frames, the CPU 71 calculates the alpha value of each pixel and stores it in array A (step S234).

The processes are preformed repeatedly up to N-th image frame being the image number i=N−1 (step S235), and the alpha value calculation process are ended by performing it repeatedly up to all pixels position (step S236).

Figure 15:
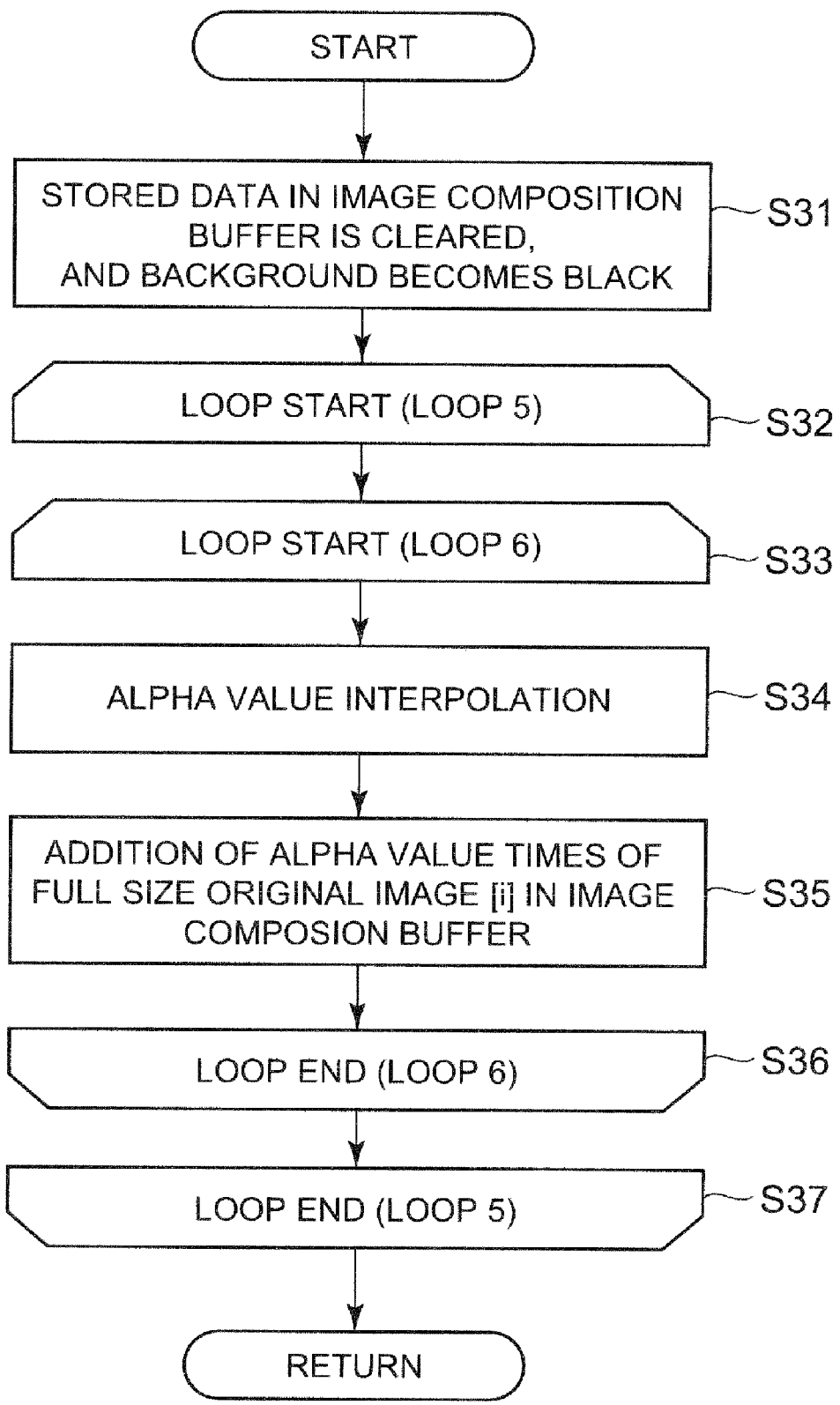
FIG. 15 is a flowchart showing an example of operations relating to a composition process of the image composition process shown in FIG. 8.

Next, the composition process is explained in detail in view of FIG. 15.

FIG. 15 is a flowchart showing an example of operations relating to the composition process of the image composition process. As shown in FIG. 15, in the composition process, the CPU 71 runs the composite program 72f in the program memory 72. First, the stored data in the image composition buffer is cleared, and the background becomes black (step S31). Then, with respect to N frames (image number i="0" to "N−1"), addition of a frame to be combined of alpha value times of each pixel is processed in loop (loop 5) (steps S32 to S37).

Specifically, first, the CPU 71 performs an interpolation process of the alpha value in the full size original image and addition of a frame to be combined by loop (loop 6) (steps S33 to S36). That is, the CPU 71 performs up scale (interpolation) of the alpha value calculated for each pixel of the reduced image to the full size (step S34). Then, the CPU 71 generates a frame to be combined by multiplying each pixel value of each valid frame by the alpha value with respect to N frames (image number i="0" to "N−1"), and adds these generated frames in the image composition buffer (step S35).

The composite image Gc is generated by performing the processes repeatedly up to N-th frame being the image number i=N−1 (step S37), and the composition process is ended.

As mentioned above, according to the image pickup device 100 of this embodiment, difference intensity of each pixel to background image Gb of an arbitrary frame of the plurality of frames is calculated based on a sum of squares with weight or an absolute value sum with weight of the color component of the frame, and the alpha value can be calculated by dividing the difference intensity by the difference intensity for the plurality of frames.

Also, since the extracted image Gm of the moving body in the arbitrary frame is outputted based on the alpha value, it is possible to stably output the extracted image Gm of the moving body of natural sense without unpleasant sensation in spite of image photographing conditions. Then, it is possible to obtain the composite image Gc by generating a plurality of frames to be combined based on the alpha value and combining the generated frames.

That is, for example, even if there is illumination variation (especially, flicker), the moving body portion is not detected in error even if size of difference varies between frames because a process of threshold value is not performed in the absolute size of difference. In addition, in order to ensure composition quality, it is preferable to cancel the influence to the blending ratio of direct current component of difference by normalization process of the difference intensity, and stabilize the background image quality by conducting the concept of the background intensity in the composition process. It is mentioned later.

Also, in an area in which the motion blur occurs, since the blending ratio becomes high sequentially according to degrees of moving body components, discontinuous, namely, the conspicuous boundary line does not arise.

Also, an area in which shadow of the moving body M or reflection occurs is recognized as a moving body with thin existence in comparison with the moving body M, specifically, the moving body main body. Accordingly, in an area in which the area in which shadow of the moving body M or reflection occurs overlaps the moving body main body of other frame, the priority is given to the moving body main body. Also, in an area in which the area in which shadow of the moving body M or reflection occurs overlaps only the background, the priority is given to the area in which shadow of the moving body M or reflection occurs. As above mentioned, it is possible to obtain natural composite result which includes portions of shadow or reflection to some extent without deleting the moving body main body.

In addition, though the composite image Gc may include blur of the moving body M by noise, resolution limit of the reduced image, and similarity of the background and the moving body M, it is possible to make the degree of the blur small by stability of the above-mentioned composition. Also, since there is no clear false edge even if the moving body M boundary is not the optimal, it is possible to improve the visual impression.

Also, since normalization of the difference intensity is performed by calculating the maximum value by subtracting the background medium value $z_p$ calculated by the adaptive binarization process from the difference intensity, it is possible to properly correct unevenness of depth of a blending ratio of a moving body M when combining it based on illumination variation.

Further, whether a frame to be combined in the composition process or not is judged based on a separated result obtained by separating it to the background portion and the moving body portion M according to the difference intensity with respect to a plurality of frames. That is, with respect to a plurality of the valid frames, since a frame (overlapping frame F) which largely overlaps other frame is judged and automatically thinned out, it is possible to optimize the composite number of frames that is the number of moving bodies M to be combined. Thus, it is possible to obtain the composite image Gc which is easy to see and is easy to grasp the motion.

Also, in the alpha value calculation process, the background intensity is calculated with respect to all pixel positions of a frame(s) selected as background, and the background intensity is added to the difference intensity of the background portion of the frame. Thereby, since the difference intensity value of all pixel positions is updated, it is possible to make it insensible with respect to very small change such as noise in the background portion. Accordingly, it is possible to prevent the instability of superiority about frames changing by small noise change. Especially, when the illumination variation occurs, it is possible to prevent that the background becomes conspicuous because of selecting from various frames.

Furthermore, the present invention is not limited to this embodiment, and it is preferable to change various improvement and design changes in the scope of the present invention.

Also, in this embodiment, though the background difference method is used in the difference intensity calculation process, the method is not limited to this. For example, after difference is obtained between adjacent frames, these intersection (AND; product set) is obtained (frame difference AND method), and thus it is not necessary to combine the background image Gb in order to calculate the original difference intensity. Further, it becomes strong to background change. Here, though the frame difference AND method itself is well known prior art, it is preferable to obtain the product set operation of the fuzzy set that is Min (the minimum value).

Also, in this embodiment, though the normalization process and the smoothing process are performed in the difference intensity calculation process, it is not limited to this. For example, whether the normalization process and the smoothing process are performed or not is changed suitably arbitrarily. That is, it is possible to perform one of the normalization process and the smoothing process, or not to perform the both processes Also, in such case, it is set to $D[p]=D_o[p]$.

Also, in the normalization process, though the difference intensity is normalized so that the membership function in the background portion becomes 0, it is not limited to this. For example, it is possible to more politely normalize the difference intensity so that the membership function in an evident moving body portion becomes a predetermined value (for example, 1 (255 if the difference intensity is 8 bits)).

Figure 16A:
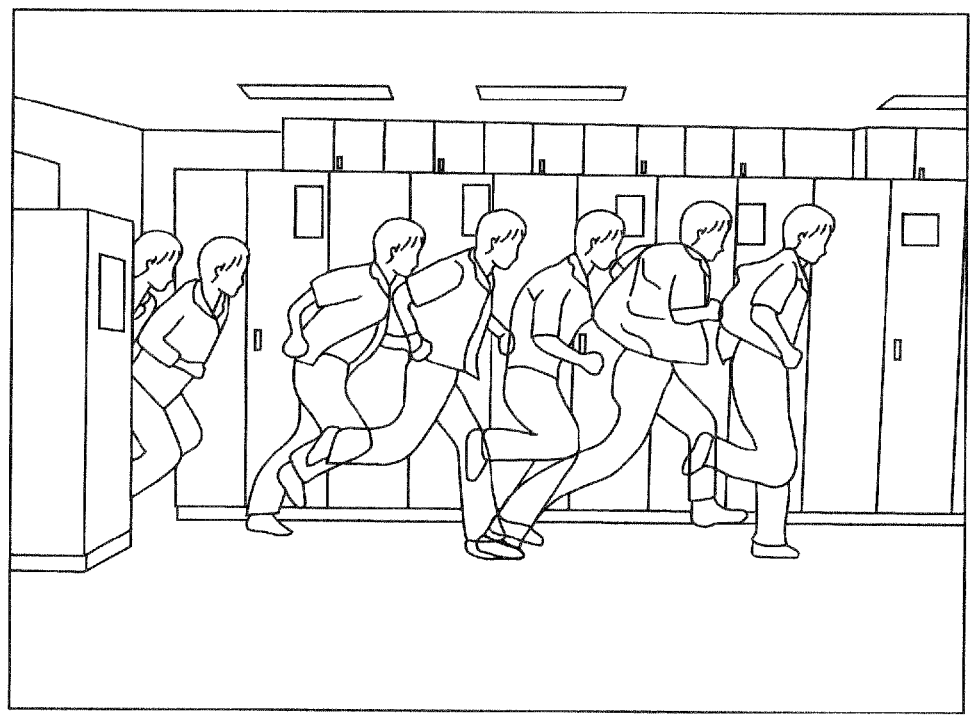
FIG. 16A is a drawing showing a typical example of a composite image relating to an image composition process by the image pickup device when a frame rate is low in the modified example 1.

Further, in the overlapping frame removal process in this embodiment, when the frame rate is high with respect to the motion speed, it is possible to arrange the moving body M in spatially almost equal intervals. On the other hand, when the frame rate is low, a gap by almost one frame may generate according to the overlapping judgment (see FIG. 16A). Especially, when a game with speediness or a movement of certain orbit is photographed, it may provide the impression which spoils the whole speediness. For example, in order to express gradual acceleration, it is desirable that the gaps of the moving body M open gradually.

Figure 16B:
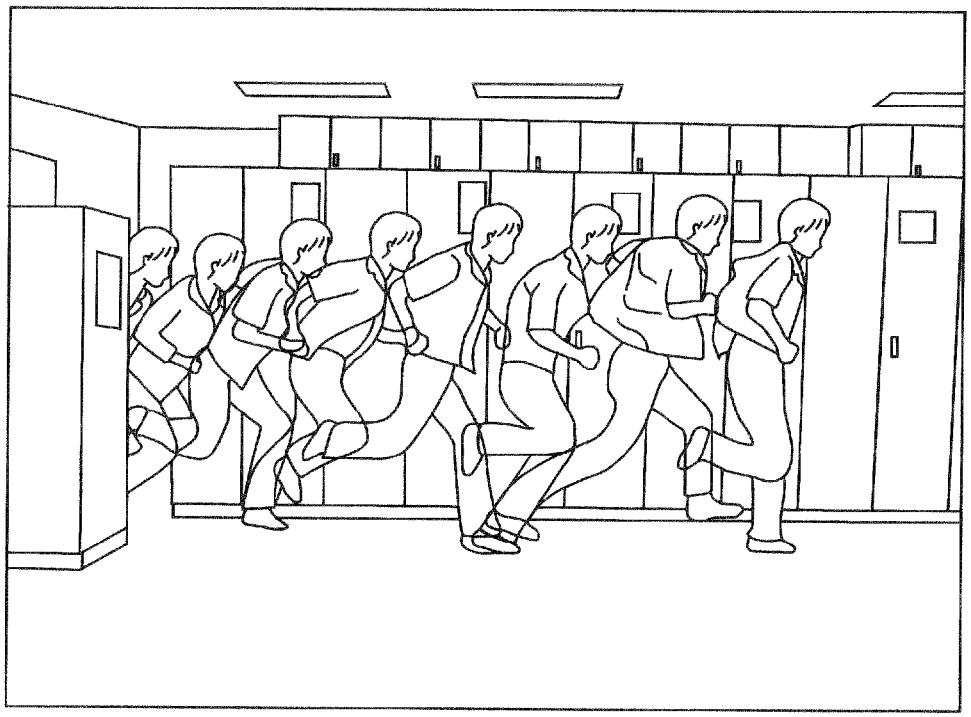
FIG. 16B is a drawing showing a typical example of a composite image relating to an image composition process by the image pickup device when an optimal frame set is selected in the modified example 1.

Therefore, while it is premised on arranging the moving body M at temporally mostly equal intervals, it is preferable to select the valid frame set which suppressed the overlap moderately. Specifically, the optimal frame set is selected on the basis of median of area ratios of all adjacent frames of the frame set arranged at temporally mostly equal intervals. Thereby, even if there are the sparse portion and the dense portion in part, it is possible to obtain an image which has just proper gaps as a whole (see FIG. 16B).

As an example of process contents, first, the frame interval is set to "a", the start frame number is set to "b", and a subset $U_{(a,b)}$ (For example, $U_{(3,1)}=\{1, 4, 7, 10, \ldots\}$, and so on) is defined. Then, it is extracted from the valid frame set V at the present time, and it is defined as $V_{(a,b)}=U_{(a,b)}\cap V$ Here, median r'(a,b) of the overlapping area is derived utilizing the above mentioned r(p,q) according to the following formula (17).

$$r'(a,b)=\mathrm{Med}_{p,p+a\in V(a,b)}r(p,p+a) \quad (17)$$

Then, a set that the number of elements becomes maximum is selected in a condition that r'(a,b) is not more than a predetermined threshold value from among the candidate sets, and the frames not included in the selected set are excluded from the valid frame set.

Also, though the median of the moving body overlapping area of the adjacent frames is used in the judgment of the overlapping frames, it is not limited to this. For example, it is possible to use the representative value of the moving body portion M relating to the adjacent frame. Specifically, if it is the representative value of the moving body overlapping area of the adjacent frame, it is possible to use the mode value or the average value.

Also, in the overlapping frame removal process, it is possible to select the frame to be combined in the composition process based on relationship of strength of the difference intensity between the adjacent frames in a plurality of frames. That is, the overlapping area of the moving body M between the adjacent frames is obtained by the fuzzy operation without binarizing the image, and it is possible to judge fuzzy value corresponding to the area as sum of the membership function (see following formula (18)) by comparing it with a predetermined threshold value.

Thereby, it is possible to reflect high ambiguous existence of the moving body M without binarizing the image.

$$r(p,q) = \frac{\sum_{x,y}\min(D[p,x,y], D[q,x,y])}{\sum_{x,y}D[p,x,y]} \quad (18)$$

Further, in the overlapping frame removal process, in order to improve the speed of processes, it is possible to use one-dimensional difference intensity (for example, if a direction of object movement is horizontal, array corresponding to horizontal line, in which the difference intensities are summed in each of vertical line. in addition, if a direction of object movement is vertical, the horizontal and the vertical are reversed.) defined in the following formula (19).

$$D_X[p,x] = \sum_y D[p,x,y] \quad (19)$$

Then, it is possible to evaluate and judge a ratio shown below by the following formula (20) as well as the above mentioned embodiment.

$$r(p,q) = \frac{\sum_x \{(D_X[p,x]>t_p) \text{ and } (D_X[q,x]>t_q)\}}{\sum_x (D_X[p,x]>t_p)} \quad (20)$$

In addition, with respect to the overlapping frame removal process, it is desirable to enable it to use the various methods shown as examples properly in the mode set by a user.

Also, in the alpha value calculation process, it is possible to calculate a blending ratio determined for each horizontal position according to the following formula (21) by using the above mentioned one-dimensional difference intensity.

$$A_X[p, x] = \frac{D_X[p, x]}{\sum_{p \in V} D_X[p, x]} \quad (21)$$

Here, in the overlapping frame removal process, when thinning out so that the overlap may hardly be allowed, since it is possible to work well by this method and decrease the number of loops, it is possible to improve the speed of calculation process Also, though it is premised that a photo is taken by the image pickup device 100 fixed to a tripod, it is possible to use it in a condition that a photo is taken by a handheld camera. That is, when the continuous shoot images photographed by the handheld camera are objects, it is possible to perform the above mentioned each process after compensating a motion of the shaking hand.

Also, when portions that do not match correctly exist in the background portion even if the motion compensation is performed, it is judged that the portions are near the moving body M, and the gap of composition may occur in the background portion. For example, it appears in the form that a portion of ridgeline of the background object becomes a little zigzag. In this case, since the background itself is seldom stared, as subjective evaluation, it is not so much conspicuous. Also, since a specular reflection or a highlight area (the place which becomes bright especially by reflection of lighting) differs by view, if camera position moves, it cannot be matched essentially. Accordingly, this area is judged as a moving body portion. Further, though it is a little conspicuous because brightness is high, the case where such an area exists is comparatively rare.

As a still further example, in order to correspond to the photographic subject that stays mostly in same position like the full-length portrait at the time of the golf swing, it is necessary to perform the following correction.

First, since it is impossible to perform the automatic composition of the background, it is necessary to take a photo of background frame separately. Second, since all frames are removed except for a first frame when performing the overlapping frame removal process, the thinning process is not performed or the thinning process is performed at proper frame intervals.

Thereby, for example, it is possible to obtain useful the composite image Gc for the kinematic analysis use.

Also, the composition of the image pickup device 100 illustrated to the embodiment is as an example, and is not limited to this.

Further, though the image pickup device 100 is explained as an example of the moving body image extraction apparatus, it is not limited to this. A plurality of frames composing a moving image obtained by the image pickup section 1 are outputted to an external device via a USB terminal 6, and it is possible to perform various processing such as pre-processing relating to the image composition process, the extraction process, and the composition process, and so on by the external device.

In addition, in this embodiment, though the functions such as the first calculation section, the summing section, the second calculation section, the output section, the third calculation section, the normalization section, the frame generation section, the combining section, the first judgment section, the second judgment section, the first estimation section, the second estimation section, the fourth calculation section are realized by performing predetermined programs, and so on by the CPU 71, it is not limited to this. For example, it is possible to construct logic circuits for realizing various kinds of functions, and so on.

What is claimed is:

1. A moving body image extraction apparatus a CPU; comprising:
   a first calculation section for calculating difference intensity relating to a background portion or other frame with respect to a plurality of frames;
   a summing section for summing the difference intensities of the plurality of frames calculated by said first calculation section;
   a second calculation section for calculating a value by dividing the difference intensity of an arbitrary frame of the plurality of frames by the difference intensity for the plurality of frames summed by said summing section; and
   a first output section for outputting an extracted image of a moving body in the arbitrary frame based on the value calculated by said second calculation section;
   wherein the first calculation section, the summing section, the second calculation section, and the first output section are implemented by the CPU.

2. A moving body image extraction apparatus according to claim 1, wherein
   said first calculation section calculates, for each pixel, the difference intensity relating to the background portion or other frame, and
   said second calculation section calculates, for each pixel, the value by dividing the difference intensity of the arbitrary frame by the difference intensity for the plurality of frames summed by said summing section.

3. A moving body image extraction apparatus according to claim 2, wherein said first calculation section calculates a sum of squares with weight of a color component difference of each image in a frame.

4. A moving body image extraction apparatus according to claim 2, wherein said first calculation section calculates an absolute value sum with weight of a color component difference of each image in a frame.

5. A moving body image extraction apparatus according to claim 1, further comprising:
   a third calculation section for calculating a representative value of the background portion from the difference intensity; and
   a normalization section for normalizing the difference intensity by calculating a maximum value by subtracting the representative value calculated by said third calculation section from the difference intensity.

6. A moving body image extraction apparatus according to claim 1, further comprising:
   a frame generation section for generating a frame to be combined by multiplying each pixel value of the arbitrary frame of the plurality of frames by the value calculated by said second calculation section;
   a combining section for combining a plurality of the frames to be combined generated by said frame generation section.

7. A moving body image extraction apparatus according to claim 6, further comprising:
   a first judgment section for separating the frame to the background portion and the moving body portion according to the difference intensity calculated by said first calculation section with respect to the plurality of frames, and judging whether the frame is a frame to be combined by said combining section based on the separated result, wherein said combining section combines the frame that said first judgment section judges the frame to be combined.

8. A moving body image extraction apparatus according to claim 6, wherein said combining section selectively combines the frame to be combined based on a representative value of the moving body portion relating to a frame adjacent in the plurality of frames.

9. A moving body image extraction apparatus according to claim 6, further comprising:
a second judgment section for judging a relationship of the difference intensities between the frames adjacent in the plurality of frames,
said combining section selectively combines the frame to be combined generated by said frame generation section corresponding to any one of the adjacent frames when said second judgment section judges that the relationship of the difference intensities is strong.

10. A moving body image extraction apparatus according to claim 6, further comprising:
a first estimation section for estimating a noise level of the background portion from the difference intensity calculated by said first calculation section;
a second estimation section for estimating a composite noise level generated by combining by said combining section from the noise level of the background portion estimated by said first estimation section;
a fourth calculation section for calculating a minimum value by subtracting a sum of the difference intensities of the moving body portion from among the difference intensities calculated by said first calculation section from a divisor minimum value being a value that increases or decreases according to the composite noise level estimated by said second estimation section; and
a second output section for outputting a value obtained by adding the minimum value to the difference intensity of the background portion calculated by said first calculation section when the minimum value calculated by said fourth calculation section is positive.

11. A moving body image extraction apparatus according to claim 1, further comprising:
an image pickup section,
wherein the plurality of frames is obtained by sequentially driving said image pickup section.

12. A non-transitory computer readable storage medium storing a program that causes a computer to realize:
a first calculation function of calculating difference intensity relating to a background portion or other frame with respect to a plurality of frames;
a summing function of summing the difference intensities of the plurality of frames calculated by said first calculation function;
a second calculation function for calculating a value by dividing the difference intensity of an arbitrary frame of the plurality of frames by the difference intensity for the plurality of frames summed by said summing function; and
a first output function for outputting an extracted image of a moving body in the arbitrary frame based on the value calculated by said second calculation function.

* * * * *